TELEGRAPH SYNCHRONIZERS

Filed Dec. 18, 1959 5 Sheets-Sheet 1

INVENTORS
FRANK D. BIGGAM
ROBERT J. REEK
BY R. C. Terry
ATTORNEY

May 8, 1962 F. D. BIGGAM ET AL 3,033,928

TELEGRAPH SYNCHRONIZERS

Filed Dec. 18, 1959 5 Sheets-Sheet 2

INVENTORS
FRANK D. BIGGAM
ROBERT J. REEK
BY R.C. Terry
ATTORNEY

INVENTORS
FRANK D. BIGGAM
ROBERT J. REEK
BY R. C. Terry
ATTORNEY

INVENTORS
FRANK D. BIGGAM
ROBERT J. REEK
BY R.C. Terry
ATTORNEY

INVENTORS
FRANK D. BIGGAM
ROBERT J. REEK
BY R. C. Terry
ATTORNEY

United States Patent Office 3,033,928

Patented May 8, 1962

3,033,928
TELEGRAPH SYNCHRONIZERS

Frank D. Biggam, Chicago, and Robert J. Reek, Mount Prospect, Ill., assignors to Teletype Corporation, Chicago, Ill., a corporation of Delaware Filed Dec. 18, 1959, Ser. No. 860,531
11 Claims. (Cl. 178—69.5)

This invention relates to telegraph synchronizers, and more particularly to apparatus for synchronizing the receiving distributors in telegraph receivers with the signals received from telegraph transmitters.

Two principal problems are involved in synchronizing the receiving distributor, the device which places received telegraph signals into a form usable by telegraph terminal equipment, of a synchronous telegraph receiver, such as a multiplex receiver.

The first problem, which may be called phase shift, arises from the fact that the positive to negative transitions of the received telegraph signals may vary, due to transmission losses, in relation to a standard or optimum time determined by the local time base generator that drives the receiver, and hence the received signals are said to lead or lag relative to the time base generator. This phase shift arises when the telegraph signals are transmitted over either wire or radio circuits. However, the problem is accentuated when the signals are transmitted over radio circuits due to so-called multipath transmission. This type of transmission is caused by the radio waves, which are reflected from the ionosphere, and since this layer varies in height during the course of a day, the problem is compounded. Consequently, a particular transition in a telegraph signal may be received directly from the transmitter, and the same transition may be received at a later and varying time because of this reflection from the ionosphere. If the receiver is receiving only reflected signals, the transitions in the signals may occur either before or after the expected time as predicted by the time base. However, over a given period of time, such variation on either side of a given time will average out and for all practical purposes, the number of transitions which occur before their correct time will equal the number of transitions which occur after such time.

An object of this invention is to provide new and improved apparatus for synchronizing the distributor of a telegraph receiver with received telegraph signals.

Another object of the invention is to provide new and improved telegraph synchronizer which averages out the overall effect of multipath transmissions of the telegraph signals.

A feature of the invention is the provision of means for sensing leading or lagging transitions of received telegraph signals relative to pulses generated by a time base generator and means operable upon the indication of a leading or lagging condition to subtract or add a pulse to the train of pulses supplied by the time base generator to drive the receiving distributor.

Another feature of the invention is the provision of means for analyzing received telegraph signals to determine if the transitions therein vary from a standard or optimum point in time.

In accordance with one embodiment of the invention, a univibrator is employed to control a constant current source to place a charge on a large capacitor. If the given transitions lag the optimum time, an incremental charge of one polarity is applied to the capacitor from the constant current source, and if the transition leads the optimum time, an incremental charge of the opposite polarity is applied to the capacitor. Consequently, the charge on the capacitor will be the resultant of small, discrete steps of potential which are either positive or negative, in accordance with the leading or lagging of the actual transitions in the incoming signal with respect to an optimum time. On the basis that such leading or lagging transitions resulting from multipath transmission will average out, the leading or the lagging of the actual transitions must persist until a predetermined charge of one polarity or another is accumulated on the capacitor in order to initiate corrective action. Such corrective action may include either the addition or the subtraction of drive pulses to the receiving distributor in order to speed up or slow down the rate of the receiver. In this manner, the receiver is maintained in synchronism with the transmitter of the telegraph signals, and the effect of multipath transmission on the transmitted signal is nullified.

The second problem involved in synchronizing a telegraph receiver, which may be called frequency drift, arises from the fact that when a crystal controlled local oscillator is employed to generate the time base, the natural frequency of the crystal may vary due to changes in temperature, etc.

Accordingly, a still further object of the invention is to provide new and improved apparatus for varying the frequency of the local oscillator of a telegraph receiver in accordance with detected leading and lagging phase relations between the locally produced signals and the received signals.

Another feature of the invention is the provision of means for varying a variable capacitor in the tank circuit of the local oscillator in accordance with detected leading and lagging phase relationships between the locally produced and the received signals.

More specifically, the preferred embodiment of the invention provides for the derivation of two separate and distinct controls from the detector of lagging or leading conditions of the signal transitions. One of these controls is applied directly to the oscillator to vary its frequency and, in the case of a crystal controlled oscillator, to compensate for frequency drift due to such causes as temperature changes. The other or rephasing control is imposed upon a gating circuit that controls the application of pulses from the oscillator to the receiving distributor. The oscillator generates pulses at a rate which exceeds considerably the number required to operate the distributor at the proper speed, and in normal operation pulses are periodically gated through to the distributor, intervening pulses being suppressed. The rephasing control is exercised by gating or suppressing additional pulses to correspondingly advance or retard the distributor.

Other objects and the many attendant advantages of the invention will become apparent upon reference to the following description when taken in conjunction with the accompanying drawings in which:

FIG. 1 is a block diagram of a telegraph synchronizer embodying certain features of the invention;

FIGS. 2 to 4, inclusive, when arranged as depicted in FIG. 5, show in schematic form the details of the circuit represented in block diagram in FIG. 1;

*General Description*

Figure 1:
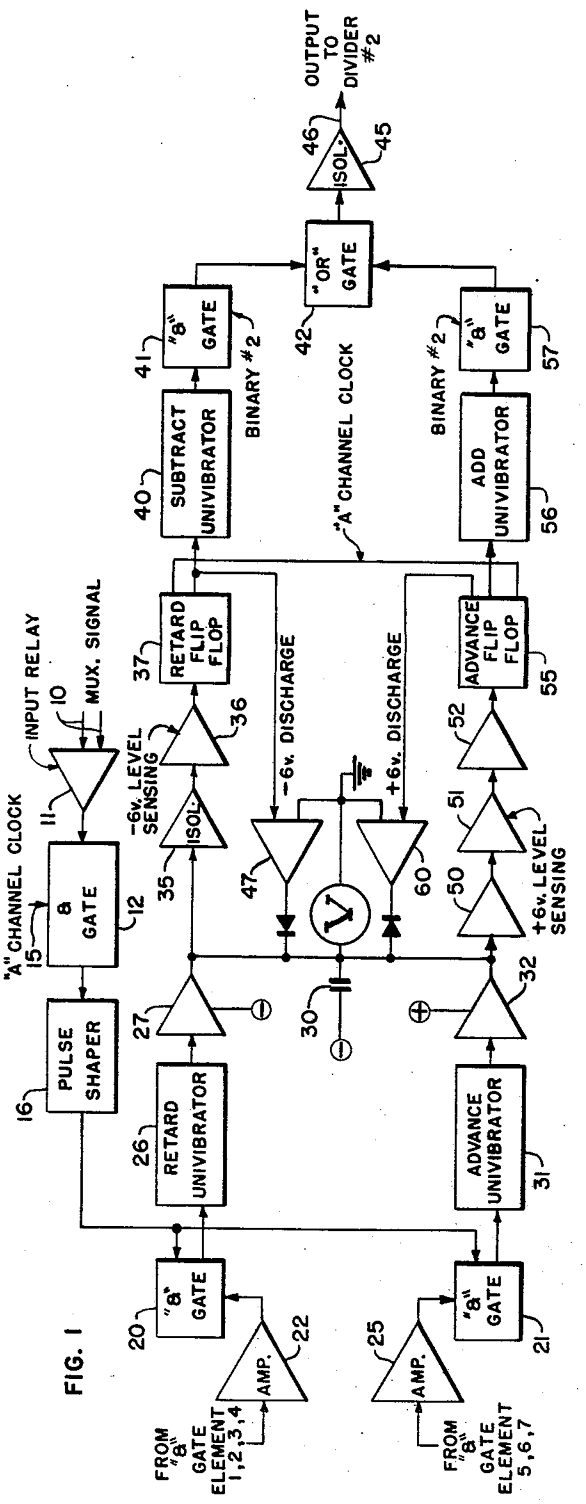

Referring now to the block diagram shown in FIG. 1, an incoming multiplex signal is applied to input leads 10—10, and the incoming multiplex signal may include signals which are associated with four channels in a multiplex receiver. Such channels are usually designated as A, B, C and D. The multiplex signals are applied through an input relay 11 and to a gating circuit 12 to which is also applied a so-called "clock" pulse associated with one of the multiplex channels. For example, there is applied to a lead 15 a potential condition which is designated in FIG. 1 as the "A channel clock." This means that during the operation of the A channel in the multiplex receiver, a conditioning potential is applied to the lead 15 and to the gating circuit 12 so that any signals which appear on the incoming leads 10—10 pass through the gating circuit 12. It is these signals which are used to cause synchronism of the receiver with the transmitter of the incoming multiplex signals.

Any signals which pass through the gating circuit 12 are applied through a pulse shaper circuit 16 to two further gating circuits 20 and 21. Connected to the gating circuits 20 and 21 are the outputs from stages of a frequency divider in the distributor driving means of the multiplex receiver. In this respect, similar structure can be provided as disclosed in Patent No. 2,865,996 to T. A. Hansen, granted December 23, 1958. For this reason, the Hansen patent is incorporated by reference to the same extent as if it were reproduced herein in its entirety. As shown in that patent, three stages 101*b* to 101*d* are connected to three gating circuits 131 to 133, inclusive and respectively. Likewise, three further stages 101*e* to 101*g* of the frequency divider 101 are connected to three gating circuits 141 to 143, inclusive and respectively. As disclosed in the Hansen patent, if a transition occurs during the time that the stage 101*a* of the frequency divider 101 is operating, no corrective action is taken to synchronize the receiver with the transmitter. However, if a transition in the incoming signal occurs before it should have, the signal transition will be leading the receiving distributor, and instrumentalities including the stages 101*e* to 101*g*, inclusive, are energized to add drive pulses to the distributor driving means so that the distributor is speeded up to be synchronized with the received signal. Conversely, if the signal transition lags the receiving equipment, instrumentalities including the stages 101*b* to 101*d*, inclusive, of the distributor 101 are energized to remove pulses from the distributor-driving means so that the distributor is slowed down to be placed in synchronism with the received signal.

It can be seen from the above commentary that if, in the synchronizer disclosed in the Hansen patent, a given transition occurs during a particular one-seventh of an impulse, the time that the stage 101*a* of the distributor 101 is operating, no corrective action is taken. This structure is modified in the present invention so that the outputs of the four stages similar to the stages 101*a* to 101*d*, inclusive, of the distributor 101 are connected together and through an amplifier 22 to the gating circuit 20. Also, outputs from stages similar to the stages 101*e* to 101*g*, inclusive, are connected together and through an amplifier 25 to the gating circuit 21. With this structure, it is assumed that a transition in an incoming signal occurs at its optimum time if it occurs as the stage 101*d* is being extinguished and the stage 101*e* is being rendered conductive. As will be discussed more fully herein below, should a transition occur before this time, a pulse will be applied to the gating circuit 20, and if it occurs after this optimum time, a pulse will be sent to the gating circuit 21.

Any pulse resulting from a signal transition occurring after it is due and which is impressed on the gating circuit 20 is applied therethrough and to a retard univibrator 26. The retard univibrator 26 is a monostable flip-flop, and each pulse being applied thereto will place the univibrator in its unstable state for a predetermined period of time. Consequently, each pulse being applied to the input thereof causes, at the output, a pulse of predetermined length which operates a constant current circuit 27. When the constant current circuit 27 is so energized, a pulse of negative polarity and predetermined length, depending upon the length of the pulse from the retard univibrator 26, is applied to a large (e.g., 1000 micro farads) capacitor 30 to discharge the capacitor and to place a predetermined, incremental and negative charge thereon. In a like manner, any pulse which is applied through the amplifier 25 and to the gating circuit 21 energizes an advance univibrator 31 so that an output from this latter univibrator energizes a constant current circuit 32 to charge the capacitor 30 with a pulse of predetermined length and positive polarity. If, because of multipath transmission, the gating circuits 20 and 21 are operated alternately for less than a predetermined time, the charge on the capacitor 30 will merely alternate in negative and positive directions. If, however, an output from, for example, the gating circuit 20 persists for a predetermined time, say 20 seconds, sufficient negative pulses will be applied to the capacitor 30 to discharge the capacitor to a predetermined value, say −6 volts. The charge on the capacitor 30 is conveyed through an isolating circuit 35 to a −6 volt level sensing circuit 36. When the charge on the capacitor has reached a level slightly more negative than −6 volts, the level sensing circuit 36 is operated to energize a retard flip-flop 37.

Two outputs are derived from the retard flip-flop 37, and one of such outputs operates a subtract univibrator 40 which energizes a gating circuit 41. The gating circuit 41 is an "and" gate and is similar in function to the gating circuit including the diodes 68, 69, 73 and 74 shown in FIG. 5 of the Hansen patent. Also, as shown in the Hansen patent, an output from a binary is applied to the gating circuit 41, and such a binary is similar to the binary 149 shown in FIG. 5 of the Hansen patent. The application of these pulses to the "and" gating circuit 41 energizes an "or" gating circuit 42 to actuate an isolating stage 45 and be applied over a lead 46 to a frequency divider in the distributor driving means. As in the Hansen patent, the output from the isolating stage 45 would be applied to the frequency divider 67 so that a pulse would be subtracted from the distributor-driving means to slow down the operation of this distributor. Since this structure was actuated because a transition in the incoming signal occurred after it was due, it can be seen that the distributor driving means properly slowed down the operation of the distributor so that synchronism of the receiver and the incoming signals would be realized. Also, a second output from the retard flip-flop 37 is applied to a retard discharge circuit 47 to cause a reduction in the negative charge on the capacitor 30 as will be described more fully herein below.

To complete the description of the structure shown in block form in FIG. 1, assume that a transition in the incoming signal leads the distributor in the multiplex receiver. In this case the leading transition will be applied to the gating circuit 21 at the same time an output from the amplifier 25 is applied thereto. Consequently, an output from the gating circuit 21 will energize the advance univibrator 31 to operate the constant current circuit 31 and place an incremental and positive charge on the capacitor 30. Assuming that this leading condition of the incoming signal persists for 20 seconds, the positive charge on the capacitor 30 will be increased to +6 volts. This potential is applied through an isolating circuit 50 to a +6 volt level sensing circuit 51, an output will be derived therefrom and inverted by a phase inverter 52, and an advance flip-flop 55 will be energized thereby. An output from the advance flip-flop 55 will operate an add univibrator 56, be applied to an "and" gating circuit 57 to which is also applied the output of a binary (similar to the binary 189 shown in FIG. 5 of the Hansen patent, and the "or" gating circuit 42 will be operated to cause the addition of a driving pulse in the distributor-driving means of the receiver in the manner described in the Hansen patent. Also, when the advance flip-flop 55 is energized, an output is derived therefrom and applied to an advance discharge circuit 60 which causes a reduction in the positive charge on the capacitor 30. As will be described more fully herein below, the potential to which the advance discharge circuit places the capacitor 30 determines the maximum rate at which pulses are added to the distributor-driving circuits.

*Preferred Embodiment*

Figure 2:
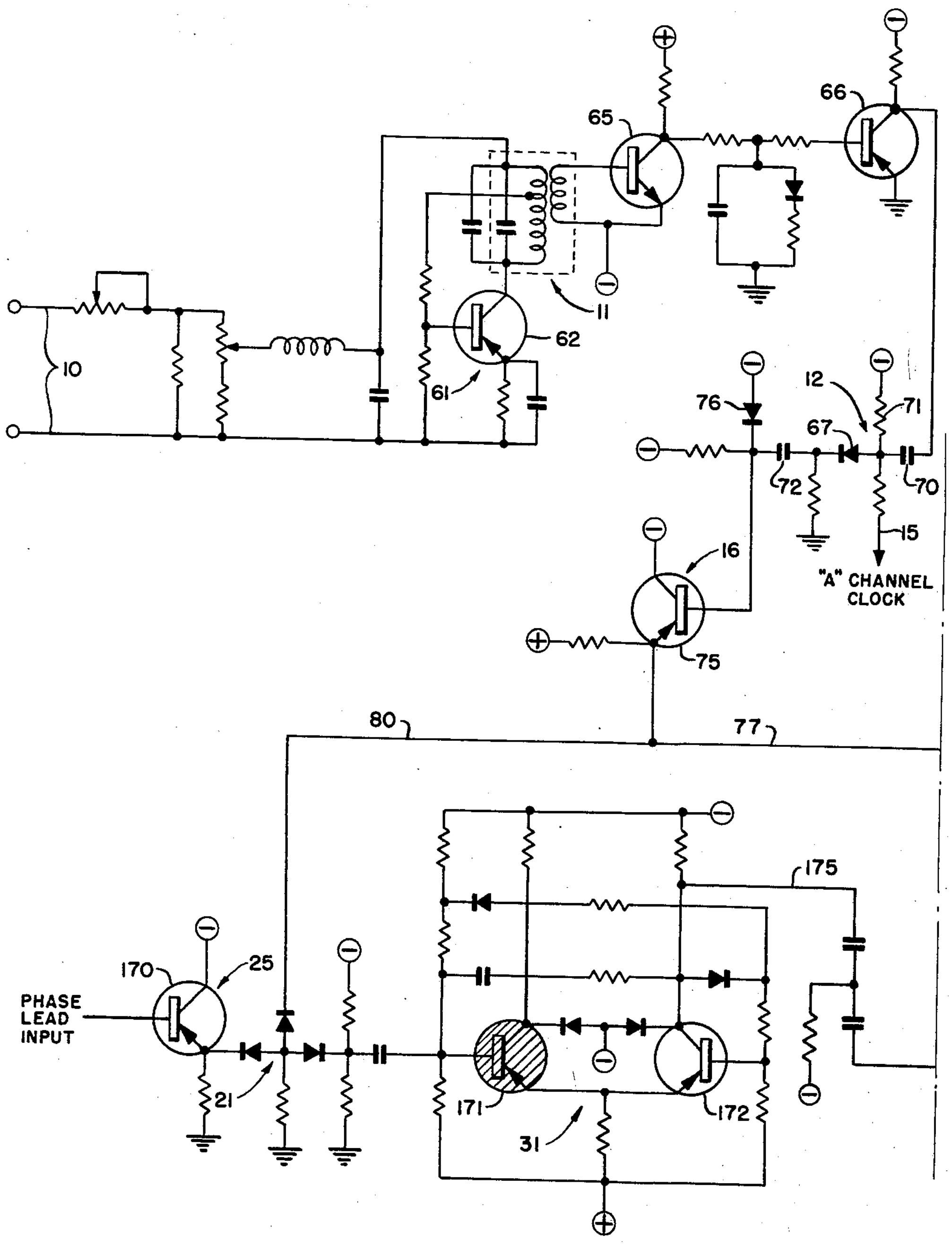
Figure 3:
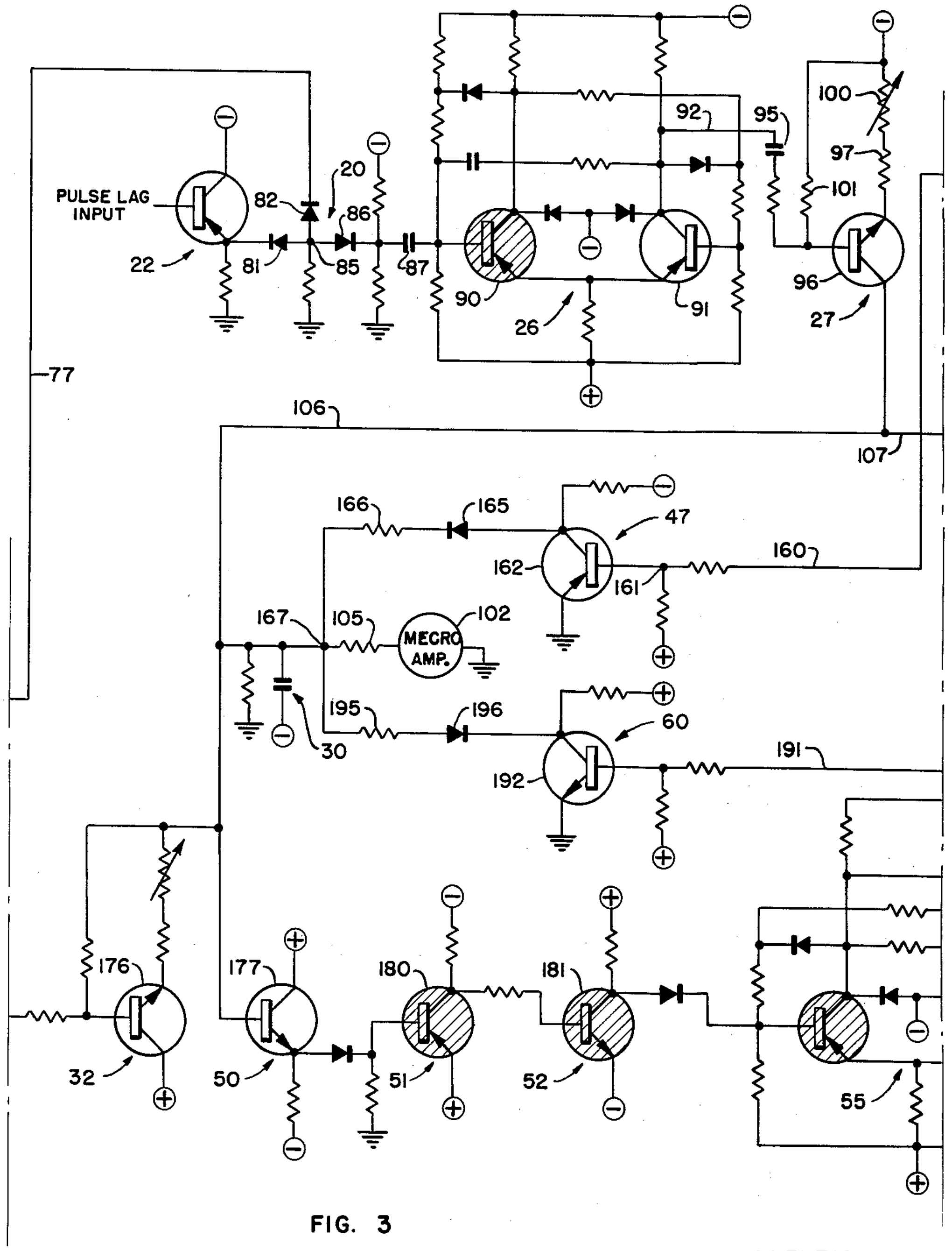
Figures 4, 5:
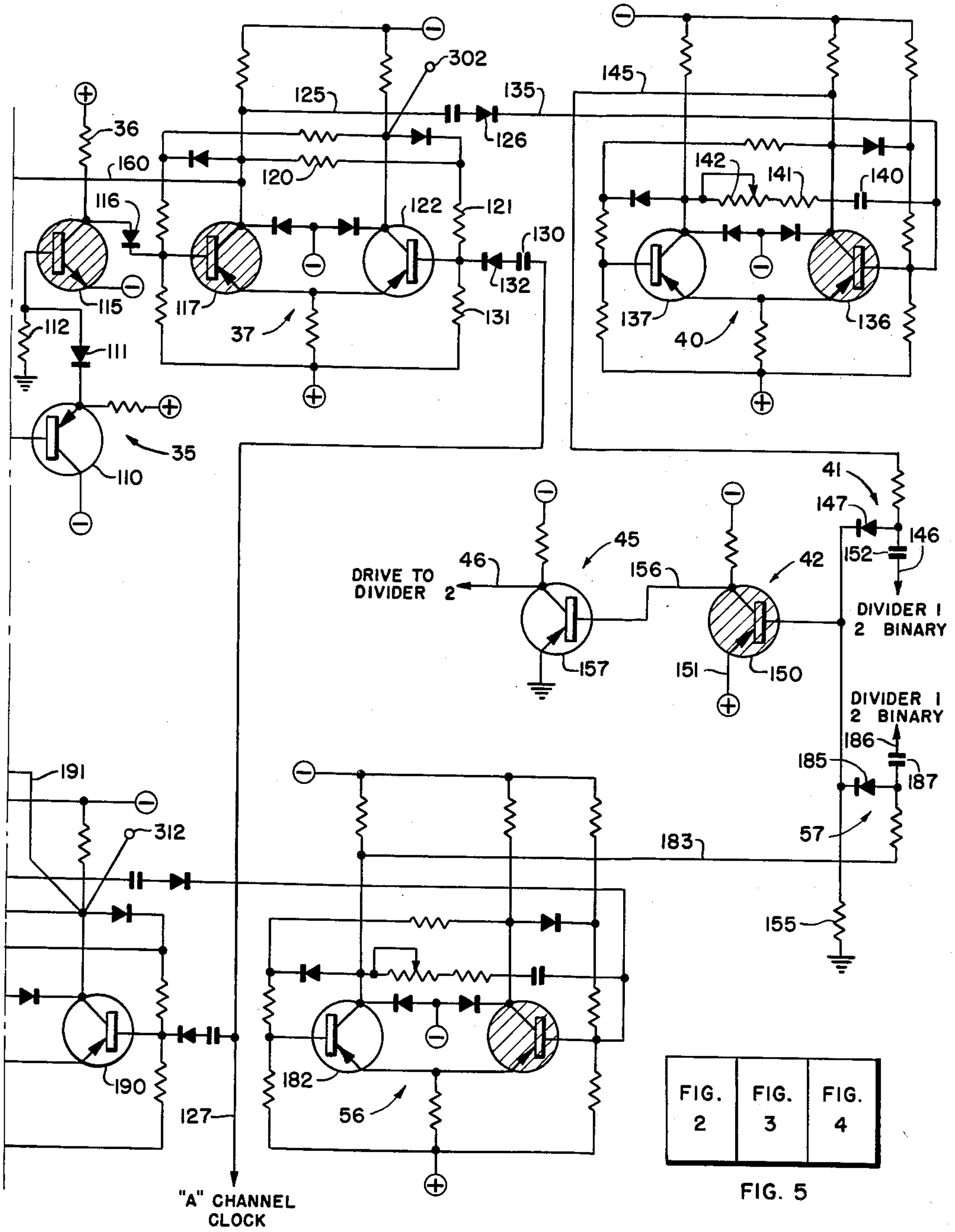

Referring now to the circuit diagram shown in FIGS. 2 to 4, inclusive, assume that transitions in an incoming signal occur after they are theoretically due, and assume that this condition persists for a time exceeding 20 seconds. Consequently, as will now be described, since this condition persists for the predetermined time, pulses will be subtracted from the distributor driving means so that the distributor will be slowed down to maintain synchronism with the incoming signals. Such signals are applied across the input leads 10—10 (FIG. 2) to the input relay 11. The input relay 11 may be similar to a transistor relay disclosed in a patent of Phillip G. Wray, No. 2,905,835, issued September 22, 1959, and the disclosure of that patent is incorporated herein by reference as if it had been reproduced herein in its entirety. For the purposes of the present invention, it is sufficient to state that a marking condition appearing on the input leads 10—10 will cause an oscillator 61 in the line relay 11 to oscillate, and such oscillation will continue for the time that the marking condition exists. Also, the potential appearing on the collector of a transistor 62 in the circuit of the oscillator 61 is an inverted version of the signal being applied to the input leads 10—10. This inverted signal is demodulated by a demodulator 65 (also described in the Wray patent and applied to the base of a transistor 66. The transistor 66 again inverts the signal being applied to the base thereof, so that the waveform of the potential on the collector of the transistor 66 is similar to the multiplex signal being applied to the input leads 10—10.

The output at the collector of the transistor 66 is applied to the gating circuit 12, to which is also applied a clock pulse from the "A" channel over the lead 15. As described in the Hansen patent, assuming that there are four channels in the receiving multiplex equipment, each of these channels will be allotted an equal time for receiving the signals designated therefor. During the time that one of the channels, the "A" channel, is operating, a relatively-positive potential is applied to the lead 15 and to the right-hand side of a diode 67 in the gating circuit 12. This relative-positive potential, of itself, is insufficient to render the diode 67 conductive. However, when a potential similar to a marking potential appears on the collector of the transistor 66, this positive-going transition is differentiated by a capacitor 70 and a resistor 71 in the gating circuit 12. This additional positive spike is sufficient to render the diode 67 conductive and will be impressed through a capacitor 72 to the base of a transistor 75 in the pulse shaper 16. The base of the transistor 75 is normally clamped at a sufficiently-negative potential through a diode 76 to prevent the conduction thereof. When a positive potential spike is applied to the capacitor 72, the transistor 75 is rendered conductive, and the positive spike will appear on the emitter thereof. This positive spike is then applied over leads 77 and 80 to the gating circuits 20 and 21, respectively.

The amplifier 22 is a transistor as shown in FIG. 3, and the emitter thereof is connected to the gating circuit 20. As described hereinabove, output from stages similar to the stages **101*a* to 101*d*, inclusive, in FIG. 2 of the Hansen patent are applied to the base of the amplifier 22. Since it was assumed that a transition in the incoming signal occurred before it was theoretically due, this signal will occur sometime during the period that the stages 101*a* to 101*d*, inclusive, is conducting. Assuming that the output from these stages is a relatively-positive potential, this potential will be applied to the base of the amplifier 22, will appear on the emitter thereof and will be applied to a diode 81 in the gating circuit 20, rendering this diode nonconductive. Then, when a positive pulse is impressed on the lead 77 from the emitter of the transistor 75, a diode 82 is likewise rendered nonconductive. Consequently, the potential of a junction point 85 increases, and the increased potential thereof renders a diode 86 conductive and is impressed through a capacitor 87 to the base of a left-hand normally-conducting transistor 90 and the retard univibrator 26. This positive potential will render the transistor 90 nonconductive, and since the univibrator 26 is connected as a monostable flip-flop, the transistor 90 will remain nonconductive and a transistor 91 associated therewith will conduct for a predetermined time, after which the transistors 90 and 91** will revert to the condition shown in FIG. 3.

An output is taken from the retard univibrator 26 from the collector of the transistor 91. When this transistor was rendered conductive, the collector potential thereof increases, and this increased potential exists for the time that the monostable flip-flop is in its unstable condition. Consequently, a positive pulse of predetermined width, say four milliseconds, is applied over a lead 92 and through a capacitor 95 to the base of a normally nonconducting transistor 96 in the constant current circuit 27. The transistor 96 functions as a switch with the emitter thereof connected through resistors 97 and 100 and the base connected through a resistor 101 to a source of negative potential. For all practical purposes, the transistor 96 will be in its nonconductive condition when no other signal is applied to its base. The positive, four millisecond pulse from the collector of the transistor 91 renders the transistor 96 conductive for the duration of the pulse. With the transistor 96 conductive, there is current flow from ground, through a meter movement 102, a resistor 105, a lead 106, the collector-emitter circuit of the transistor 90, and the resistors 97 and 100 to the negative source of potential. This current flow produces a negative voltage at the junction of the resistor 105 and the capacitor 30, and it will cause a negative charge to build up on the capacitor. If no other signal is furnished to the capacitor 30 than that from the transistor 96 in the constant current circuit 27, the charge on the capacitor 30 will increase with each pulse of energy furnished by the transistor 91. The potential on the capacitor 30 is applied over a lead 107 to the base of a transistor 110 in the isolating circuit 35. The transistor 110 is connected as an emitter-follower such that the negative potential being applied to the base thereof appears on the emitter and renders a diode 111 conductive so that this decreased potential appears across a resistor 112. The voltage across the resistor 112 is applied to the base of a normally-conductive transistor 115 in the —6 level sensing circuit 36. When the voltage on the capacitor 30 and, hence, on the base of the transistor 115 exceeds —6 volts, the transistor 115 is rendered nonconductive, and the collector potential thereof will increase. It can be seen, that leading transitions in the signal on the input leads 10—10 must persist for a predetermined time to provide sufficient negative pulses from the retard univibrator 26 to discharge the capacitor 30 to —6 volts. When this charging potential for the capacitor persists for this predetermined time, for example, 20 milliseconds, the charge on the capacitor 30 and the potential of the emitter of the transistor 110 will cause the transistor 115 in the —6 volt level sensing circuit 36 to be rendered nonconductive so that a positive potential appears on its collector.

The positive potential appearing on the collector of the transistor 115, upon its being rendered nonconductive, renders a diode 116 conductive and is applied to the base of a left-hand, normally conductive transistor 117 in the retard flip-flop circuit 37. The positive potential on the base of the transistor 117 renders this transistor nonconductive, and the collector potential thereof decreases. This decreased potential is applied across resistors 120 and 121 to the base of a right-hand transistor 122 in the retard flip-flop 37, to render the transistor 122 conductive. The negative potential on the collector of the transistor 117, upon its being rendered nonconductive, is also impressed on a lead 125 and a diode 126, but it has no effect on the diode 126 at this time. Then, upon the generation of the "A" channel clock pulse, the clock pulse is applied over a lead 127, and the positive-going transition thereof is differentiated by a capacitor 130 and a resistor 131 and is applied to the base of the now-conducting transistor 122 in the retard flip-flop 37. The negative going transition of the "A" channel clock pulse being applied to the lead 127 is blocked by a diode 132 so that it is ineffective. However, the positive-going transition thereof is sufficient to again render the conducting transistor 122 nonconductive to return the retard flip-flop 37 to the condition shown in FIG. 4, that is, with the left-hand transistor 117 conducting. When the transistor 117 again conducts, its collector potential increases, and this increase in potential is applied over the lead 125 to render the diode 126 conductive. Consequently, this positive potential is applied over a lead 135 and to the base of a normally-conducting, right-hand transistor 136 in the subtract gate univibrator 40. This univibrator is connected as a monostable flip-flop, and the positive potential applied to the base of the right-hand transistor 136 is sufficient to render this transistor nonconductive. Consequently, a left-hand transistor 137 in the univibrator 40 is rendered conductive, and such conduction will be maintained for a predetermined time as determined by the circuit timing elements, a capacitor 140 and the resistors 141 and 142, of the univibrator. During the time that the univibrator 40 is in its unstable state, the collector of the nonconducting transistor 136 is at some decreased potential. When the univibrator 40 returns to its original quiescent condition, the collector potential of the transistor 136 is at a relatively positive potential. These potentials are applied to the subtract gate 41 over a lead 145.

As described hereinabove, the output of a binary such as the binary 147 in FIG. 5 of Hansen patent is applied to the subtract gate 41 over a lead 146. Normally, when the subtract gate univibrator 40 is in its quiescent condition, with the right-hand transistor 136 therein conducting, the collector of the transistor 136 is at some relatively-positive value which is applied over the lead 145 and which renders a diode 147 in the "and" gate 41 conductive. Under this quiescent condition, the potential being applied at this time to the base of a transistor 150 in the "or" gate circuit 42 may be in the order of +1 volt, and the emitter of the transistor 150 may be connected over a lead 151 to +1.5 volts. Consequently, the base-to-emitter potential of the transistor 150 is negative, and the transistor will be maintained conductive. The output of the binary (similar to the binary 147 in the Hansen patent) being applied to the lead 146 in a square waveform and is differentiated by a capacitor 152 and a resistor 155. The positive spikes resulting from such differentiation increase the conduction of the diode 147 and drive the potential of the base of the transistor 150 positive with respect to its emitter potential so that the transistor 150 is rendered nonconductive. In the nonconductive condition, the collector voltage of the transistor 150 will decrease, and this decreased potential is applied over a lead 156 to the base of a transistor 157 in the isolating circuit 45 rendering the transistor 157 conductive. The positive spike which renders the transistor 157 conductive causes a positive spike of potential to appear on the collector of the transistor 157, and such a positive pulse is applied to the driving means of one of the frequency dividers (similar to the frequency divider 67 in Hansen patent) which causes the driving of the distributor in the receiver.

When the subtract gate univibrator 40 operates, a negative pulse is obtained from the collector of the transistor 136 in the manner described hereinabove. This negative pulse is applied over the lead 145 and to the diode 147, and it prevents the diode 147 from conducting. Under this condition, when a positive spike is furnished from the binary similar to the binary 147 in Hansen patent and over the lead 146, the spike is not sufficient to render the diode 147 conductive so that the transistor 150 will not be cut off. This effectively eliminates one positive spike from the output of the transistor 157 and eliminates one drive pulse for the distributor driving means. Consequently, the distributor will be slowed down, and this is precisely the desired result to effect synchronization between the distributor and the incoming signal transitions because such transitions were lagging the distributor as described hereinabove.

Each time that the −6 volt level sensing circuit 36 operates, a drive pulse is eliminated from the distributor-driving means in the manner described hereinabove. This occurs since the rendering nonconductive of the transistor 115 in the −6 volt level sensing circuit operates the retard flip-flop circuit 37. When this latter circuit operates, the left-hand, normally conductive transistor 117 therein is rendered nonconductive, and the collector potential thereof drops. This drop in potential is impressed on a lead 160 and causes the voltage at a junction point 161 to become negative. This negative potential is then applied to the base of a normally-nonconductive transistor 162 in the retard discharge circuit 47, to render the transistor 162 conductive. When the transistor 162 conducts, there is current flow from ground, through the transistor 162, a diode 165, a resistor 166, the resistor 105 and the capacitor to −12 v. This current flow tends to produce a zero potential at a junction point 167 and will cause a reduction in the negative charge on the capacitor 30. Thereafter, when the transistor 117 is rendered conductive, upon the retard flip-flop 37 returning to its original state, the collector potential thereof increases, and such an increase in potential is applied over the lead 160 and again renders the transistor 162 nonconductive. With this structure the negative charge which had built up on the capacitor 30 is made more positive. If the lagging condition of the input signal continues, negative increments of potential continue to be built up on the capacitor 30 until it reaches −6 volts. At this time, the transistor 115 in the −6 volt level sensing circuit 36 is again rendered nonconductive, and another pulse is deleted from the distributor driving means. Consequently the voltage to which the charge on the capacitor 30 is built by the retard discharge circuit determines the maximum rate at which pulses are deleted from the distributor-driving means.

Substantially the same structure is provided for adding drive pulses to the distributor-driving means in the cases where the incoming signal leads the receiver distributor and such a leading condition persists for a predetermined time. In this latter situation, stages similar to the stages 101e to 101g, inclusive, of the Hansen patent, apply outputs to the base of a transistor 170 in the amplifier 25, rendering the transistor conductive. As described hereinabove, when a clock pulse is applied to the lead 15, the advance univibrator 31 will be operated, and the conductive states of two transistors 171 and 172 therein are reversed from that shown in FIG. 2 for a predetermined time. An output from the advance univibrator is applied to a lead 175 and to the base of a transistor 176 in the constant current circuit 32. Consequently, the capacitor 30 is charged through the constant current circuit 32 in a positive direction by a small, positive potential each time the advance univibrator 31 is operated. The output of the constant current circuit 32 is also applied to the base of a transistor 177 in the isolating circuit 50, and when it reaches a potential slightly greater than +6 volts, a transistor 180 in the +6 volt level sensing circuit 51 is rendered nonconductive. An output, taken from the collector of the transistor 180 renders a transistor 181 in the phase inverter circuit 52 nonconductive, and an output therefrom operates the advance flip-flop 55 in a manner similar to the operation of the retard flip-flop 37. Thereafter, the add gate univibrator 56 is operated so that a left-hand, normally nonconductive transistor 182 therein is rendered conductive for a predetermined time. When the transistor 182 is rendered conductive, the collector potential thereof increases, and the increased potential is impressed over a lead 183. Prior to this time, that is, when the transistor 182 was nonconductive, the relatively-negative potential on the collector thereof prevented the conduction of a diode 185 in the "and" gate circuit 57. Under this condition, the diode 185 could not be rendered conductive by the output from the binary in the frequency divider of the distributor-driving means. As mentioned hereinabove, this binary is similar to the binary 189 of the Hansen patent, and its square wave output is applied to a lead 186, is differentiated by a capacitor 187 and the resistor 155, and the positive and negative spikes resulting from such differentiation are applied to the diode 185. The positive spikes are not sufficient to overcome the negative potential being applied to the diode 185 from the collector of the nonconducting transistor 181 in the add gate univibrator 56. When, however, the add gate univibrator 56 is operated and the transistor 181 therein is rendered conductive, the positive potential on the collector of this transistor is applied through the diode 185 and to the base of the normally conducting transistor 150 in the "or" gate 42. However, in view of the positive potential being applied to the emitter of the transistor 150, this transistor will remain in its conductive condition. During the time that the diode 185 is conducting, a positive spike is furnished from the binary (similar to the binary 187 in Hansen patent) to the lead 186, and this positive spike is also applied to the diode 185 and to the base of the conducting transistor 150. In this case, sufficient positive potential is applied to the base of the transistor 150 to render the transistor nonconductive. Consequently, the collector potential of the transistor 150 decreases, and this decreased potential is applied over the lead 156 and to the base of the normally-nonconducting transistor 157 to render this transistor conductive. When the transistor 157 is rendered conductive, a positive spike appears on the collector thereof. Since the signals being applied to the capacitor 187 are 180 degrees out of phase with each other, when the add gate univibrator 56 operates, one extra spike appears in the output potential at the collector of the transistor 181. This additional pulse is applied to the distributor-driving means to speed up the operation of the receiver distributor. It can be seen that this was the desired result since the signals being applied to the input leads 10—10 were leading the distributor, and the distributor had to be speeded up in order to cause synchronization therebetween.

Each time the advance flip-flop 55 is operated to add a pulse to the distributor driving means, a portion of the positive charge on the capacitor 30 is removed therefrom by the advance discharge circuit 60. When the advance flip-flop 55 operates, a right-hand transistor 190 therein is rendered conductive, and the collector potential thereof increases. This increased potential is applied over a lead 191 and to the base of a transistor 192 in the advance discharge circuit 60 to render the transistor 192 conductive. When the transistor 192 conducts, there is current flow from ground, through the meter movement 102, the resistor 105, a resistor 195, a diode 196 and the transistor 192 to ground. This current flow tends to produce a negative voltage at the junction point 167 and will cause a reduction in the positive charge on the capacitor 30. When the transistor 190 is rendered nonconductive again, after a cycle of operation of the advance flip-flop 55, its collector potential drops, and this drop in potential is applied over the lead 191 and to the base of the transistor 192 in the advance discharge circuit 60, rendering the transistor 192 again nonconductive. The circuitry is so designed that a portion of the positive charge of the capacitor 30 is removed therefrom so that a plurality of voltage steps must be received from the constant current circuit 32 in order to build up the voltage on the capacitor 30 to +6 volts. Consequently, the amount of charge which is removed from the capacitor 30 by the advance discharge circuit 60 determines the rate at which pulses are added to the distributor-driving means.

Figure 6:
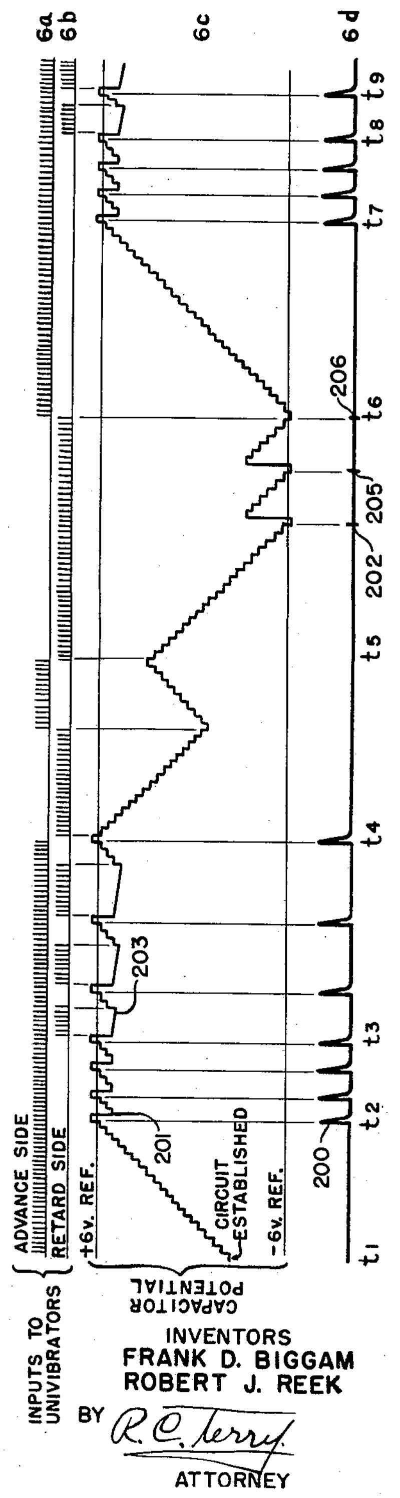
FIG. 6 shows a plurality of waveforms of potentials which appear at different points in the circuit shown in FIGS. 2 to 4, inclusive.

Referring now to the waveforms shown in FIG. 6, FIG. 6*a* shows a plurality of voltage spikes that represent outputs from the constant current circuit 32 which is energized by the advance univibrator 31. The plurality of voltage spikes shown in FIG. 6*b* represents the output from the constant current circuit 27 which is operated by the retard univibrator 26. As described hereinabove, the effect of multipath transmission on the incoming signals will be to cause transitions therein to both lead and lag the receiving distributor. Also, should a given transition vary about its optimum position, it is possible to have inputs to the amplifiers 22 and 25 at substantially the same time. In this case, the advance univibrator 31 and the retard univibrator 26 will be operated at substantially the same time so that equal positive and negative charging impulses are applied to the capacitor 30. When this occurs, there is no net effect on the charge on the capacitor 30. This and other operations of the circuit can be seen by referring to FIG. 6*c*, wherein an exaggerated representation of the charge on the capacitor 30 is shown.

Referring to FIG. 6*c*, assume that the circuit is established at time $t_1$. At this time, it can be seen by referring to FIG. 6*a*, that the input signals are leading the receiving distributor so that only pulses are received from the advance side of the synchronizer. These voltage spikes place a positive-going charge on the capacitor 30, and when such a charge reaches +6 volts (at time $t_2$) a pulse is added to the distributor-driving means as shown at point 200 in FIG. 6*d*. The advance discharge circuit 60 discharges the capacitor 30 to a point 201 (FIG. 6*c*), but since the incoming signal continues to lead the receiving distributor, pulses on the advance side again charge the capacitor 30 to +6 volts. Each time this occurs, a pulse is added to the distributor driving means, as can be seen in FIG. 6*d* between times $t_2$ and $t_3$. Between times $t_3$ and $t_4$, pulses are generated on both the advance and retard sides, but referring to FIG. 6*a* and 6*b*, it can be seen that more pulses occur on the advance side than on the retard side. Consequently, when pulses are actually generated at the same time on both sides, there is substantially no effect on the capacitor 30 (see FIG. 6*c* between the times $t_3$ and $t_4$). When, however, no pulses occur on the retard side, the capacitor 30 is charged to its +6 volt potential so that an additional pulse is applied to the distributor-driving means.

Between the times $t_4$ and $t_5$, a series of pulses first occurs on the retard side, and then a series of pulses occurs on the advance side. Consequently, during this time interval, the capacitor 30 is charged negatively, and, when the pulses occur on the advance side, the capacitor is charged in a positive direction. At $t_5$, a long series of pulses starts only on the retard side. Consequently, the capacitor is charged negatively, and when such charge reaches −6 volts, the retard flip-flop 37 is actuated to remove a pulse from the distributor-driving means. This occurs at the point 202 shown in FIG. 6*d*. Since the pulses persist on the retard side during the interval between times $t_5$ and $t_6$, two further pulses are removed from the distributor-driving means, and these removals are designated by the points 205 and 206 in FIG. 6*d*.

Then, at time $t_6$, multipath transmission has caused the signal to lead the receiving distributor so that pulses are received only on the advance side. These pulses cause the capacitor to be charged in a positive direction until the charge thereon is +6 volts. At this time, the time $t_7$, a pulse is added to the distributor driving means because of the persistence of the leading condition of the signal with respect to the receiving distributor. During time $t_7$ to $t_8$, further pulses occur only on the advance side so that a plurality of pulses are added to the distributor-driving means. Then between times $t_8$ and $t_9$, the receiving distributor is in substantial synchronism with the incoming signals so that pulses apply on both the advance and retard sides. When pulses occur on both sides, there is no substantial effect on the capacitor 30; the usual voltage leakage from the capacitor is represented by that portion of the curve identified by reference numeral 203. When, however, more pulses occur on the advance side than on the retard side, drive pulses are eventually added to the distributor-driving means.

From the above description, it can be seen that the effect of multipath transmission on the synchronizer embodying the invention is averaged out for all practical purposes. In the overall picture, the result of multipath transmission can be seen by referring to the capacitor potential in FIG. 6*c* during the interval between times $t_4$ and $t_5$ There, the capacitor 30 is first charged in a negative direction, then charged in a positive direction, and finally, again charged in the negative direction. During this whole time, no pulses have been either added to or subtracted from the distributor-driving means. This result is desirable since, in the overall picture, multipath transmission will usually average out. With the present invention, such averaging out is caused by not permitting the synchronizer either to add pulses to or to subtract pulses from the distributor-driving means unless the leading or lagging of the incoming signal with respect to the distributor persists until a predetermined charge on the capacitor has been accumulated.

*Alternate Embodiment*

Figure 7:
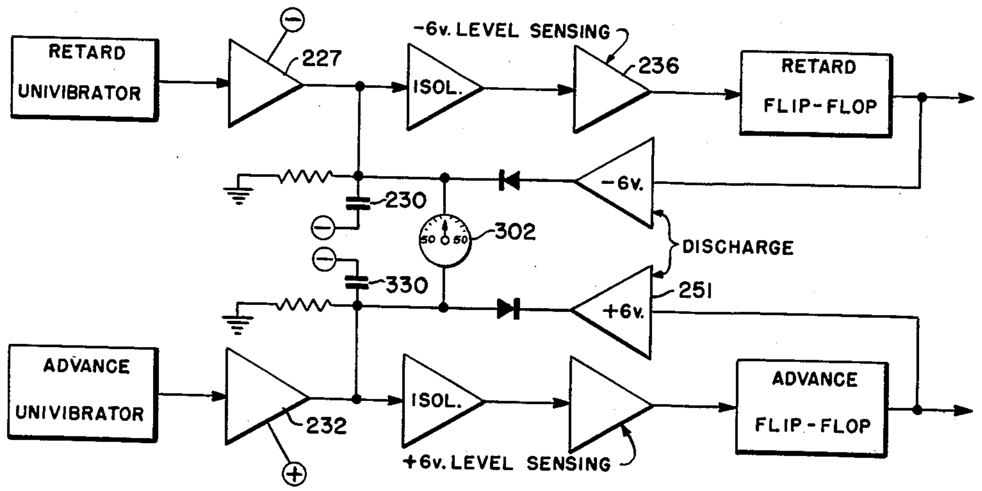
FIG. 7 is a block diagram of an alternate embodiment of the invention.

Refer now to FIG. 7, wherein a block diagram of an alternate embodiment of the invention shown in FIG. 1 is shown. In this alternate embodiment, two capacitors, 230 and 330, are used instead of only the one capacitor shown in FIG. 1. Otherwise, the circuit is substantially similar to that shown in FIG. 1. In this alternate embodiment, the capacitor 230 is discharged through a constant current circuit 227 until a −6 volt level sensing circuit 236 is energized to subtract drive pulses from the distributor driving means as explained with reference to FIG. 1. Also, the capacitor 330 is charged through a constant current circuit 232 until a +6 volt level sensing circuit 251 is energized thereby to cause, eventually, the addition of a drive pulse to the distributor driving means. A meter movement 302 is connected across the capacitors 230 and 330 to measure the differential charge therebetween.

*Frequency Synchronization*

In multiplex equipment, as in all electrical systems having a plurality of variables, the greater the number of variables which can be controlled, the greater the overall control which can be exercised over the equipment or systems. The foregoing has dealt with the control of the phase relationship between the signals received by a multiplex receiver and the signals produced by the local oscillator of the multiplex receiver. If, in addition to independent means for controlling the phase relationship of the signals, means are provided for controlling the frequency of the local oscillator at both the transmitter and receiver multiplexes, analogous to oscillator 66 disclosed in the above-identified Hansen patent, a higher degree of synchronization can be effected between the transmitter multiplex and the receiver multiplex.

Figure 8:
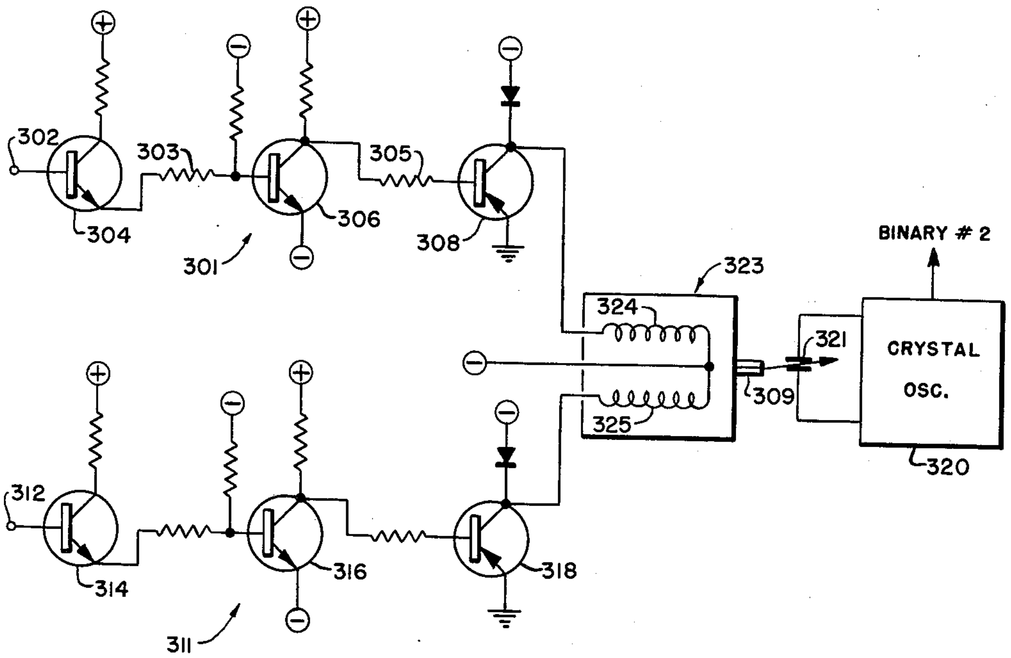
FIG. 8 is a circuit diagram, partly schematic, showing the frequency synchronizer for the local oscillator.

Accordingly, there are shown in FIG. 8, two amplifier circuits, 301 and 311, operable to adjust the frequency of the local oscillator 320 in accordance with the phase relationship between the received multiplex signals and the signals produced by the local oscillator. Connected across the oscillator 320 is a tank circuit including a variable capacitor 321 which is controlled by a rotative device 323 having separate windings 324 and 325. The rotative device 323 is of the dual rotative type disclosed in Patent No. 2,441,207 to L. M. Potts, granted May 11, 1948; the Potts patent is incorporated herein by reference to the same extent as if it were reproduced herein in its entirety. Windings 324 and 325 are analogous to electromagnets 41 and 61 shown in the Potts patent and it will be understood that as utilized in the instant disclosure the ring 47, shown in the incorporated Potts patent, would be a toothed member and would be interconnected to the shaft 309 by suitable gearing (not shown). Amplifier circuits 301 and 311 include emitter followers 304 and 314, amplifier transistors 306 and 316, and power amplifiers 308 and 318, respectively. Amplifier circuit 301 is connected, as indicated by terminal 302, to the collector of transistor 122 of retard flip-flop 37, FIG. 4, and amplifier circuit 311, as indicated by terminal 312, is connected to the collector of transistor 190 of advance flip-flop 55.

Upon the indication of a phase displacement between the locally produced signals and the received signals, for example, a lead in phase relation, the retard flip-flop 37 is triggered to its second state, with the right-hand side conducting, and transistor 122 is driven to saturation and remains at saturation until the flip-flop 37 is reset by pulse from the A channel clock over the lead 127. As transistor 122 is driven to saturation, its collector potential rises and this rise is coupled to the base of emitter follower 304 of the amplifier circuit 301. As the base of emitter follower 304 rises in potential, the potential of the emitter follows correspondingly and the rise in potential is coupled to the base of amplifier transistor 306 by resistor 303, and is of sufficient magnitude to render transistor 306 conductive to a state of saturation. As transistor 306 is driven to a state of saturation, its collector becomes increasingly negative and this negative rise is coupled by resistor 305 to the base of power transistor 308 and renders the transistor 308 conductive to a state of saturation. When transistor 308 is conducting to a state of saturation, an energization circuit is completed from the source of potential 310, through the rotative device winding 324 and through the collector-emitter circuit of transistor 308 to ground. Thus the rotative device is energized and its shaft 309 is rotated a predetermined amount and in such a direction as to increase the capacitance of capacitor 321 and accordingly, decrease the frequency of the crystal oscillator 320.

In similar manner, amplifier circuit 311 is operable to effect a decrease in the capacitance of capacitor 321 and hence increase the frequency of the oscillator 320 upon the indication of a lag in phase relation in the phase synchronization circuitry. Transistor 190, of advance flip-flop 55, is driven to saturation upon the indication of a retard phase condition between the received and transmitted signals, and is effective to turn on emitter follower 314. The operation of emitter follower 314 renders amplifier 316 conductive to saturation and consequently, renders amplifier 318 conductive to a state of saturation. When transistor 318 is conducting to saturation, an energization circuit is completed from the source of potential 310, through the winding 325 and the collector-emitter circuit of transistor 318. Consequently, the rotative device 323 is actuated and the shaft 309 is rotated in such a direction as to decrease the capacitance of variable capacitor 321 a predetermined amount and hence to increase the frequency of the local oscillator 320. Thus the rotative device controlled capacitor 321 operates as a vernier for obtaining fine control over the receiver multiplex and for obtaining a high degree of synchronism between the oscillators of the transmitter and receiver multiplexes.

Each multiplex station is provided with the two amplifier circuits for controlling the local oscillator and, since the local oscillator at each multiplex station pulses both the transmitter and receiver multiplex, the local oscillators will be "chasing" each other. Accordingly, an extremely high degree of frequency synchronization is achieved between the local oscillators of the multiplex stations.

It will be understood that the frequency control circuitry of FIG. 8 is designed for integral operation with both the preferred and alternate embodiments of applicant's invention. Also, the frequency control circuit may be cut out, by suitable switching means, of the multiplex system and the multiplex system operated with only the phase correction circuitry utilized.

It is to be understood that the above-described arrangements and construction of elements are simply illustrative of the invention and many other modifications may be made without departing from the invention.

What is claimed is:

1. A telegraph receiver synchronizer which comprises means for sensing a leading transition in a telegraph signal, means for sensing a lagging transition in the telegraph signal, a single synchronizing information storage capacitor, means energized by the two sensing means for applying to said one capacitor incremental charges of positive or negative polarity depending upon which of said two sensing means senses a transition, and utilization means energizable by the capacitor upon accumulation thereon of a positive or negative charge of predetermined magnitude relative to a standard potential for imposing a corrective effect on telegraph receiver.

2. A telegraph receiver synchronizer which comprises means for sensing transitions in a telegraph signal including transitions which occur at other than an optimum time, a single synchronizing information storage capacitor, means energized by the transition sensing means for applying cumulative charges on said one capacitor, and utilization means energized by the stored charge on said one capacitor upon accumulation thereon of a charge equaling a predetermined magnitude in response to the occurrence of transitions at other than optimum time for imposing a corrective effect on the telegraph receiver.

3. A telegraph receiver synchronizer which comprises means for sensing the transitions in a telegraph signal, a single synchronizing information storage capacitor, means energized by the transitions-sensing means for applying incremental charges on said one capacitor of positive or negative polarity utilization energized by the charge on said one capacitor upon the accumulation thereon of a charge at least equaling a predetermined positive or negative potential, and positive and negative discharge circuits for partially reducing the charge on the said one capacitor each time one of the utilization means is energized thereby.

4. Apparatus for synchronizing the distributor of a telegraph receiver with a received signal, which comprises means for comparing times of occurrence of transitions in the received signal with the times of occurrence of transitions as predicted by the receiving distributor, a single synchronizing information storage capacitor, means energized by the signal-transitions-comparing means for incrementally charging and oppositely charging said one capacitor in accordance with the signal transitions occurring at times other than optimum times, and means energized only upon accumulation of a predetermined charge on said one capacitor for correcting the phase relationship of the distributor to received signals.

5. Apparatus for synchronizing a telegraph receiving distributor with the signals received thereby, which comprises sensing means for providing a control pulse each time a transition in the received signal occurs at a time other than a locally generated timing pulse generated by the distributor, a single synchronizing information storage capacitor, means energized by the control pulses for charging or oppositely charging said one capacitor incrementally depending upon the relationship of the transitions in the received signal to said locally generated timing pulse, correcting means energized in one sense under the control of said one capacitor upon that capacitor reaching a predetermined charged condition and in a second sense upon the same capacitor reaching a predetermined different charged condition, and means operated by the correcting means for varying the speed of the receiving distributor until the locally generated timing pulses coincide with the time of occurrence of the signal transitions.

6. Apparatus for synchronizing a telegraph receiving distributor with telegraph signals being received thereby, which comprises a first sensing means for sensing transitions in the signals which occur before a predetermined optimum time, a second sensing means for sensing transitions in the signals which occur after the optimum time, a single synchronizing information storage capacitor, a first constant current circuit for impressing equal incremental charges on said one capacitor, a second constant current circuit for impressing equal incremental charges of opposite polarity on said one capacitor, means operated by each of the sensing means for energizing one of the constant current circuits and for placing its incremental charge on said one capacitor, and utilization means energized by the accumulation on said one capacitor of a charge of a predetermined magnitude and of either polarity for correspondingly varying the speed of the receiving distributor.

7. Apparatus for synchronizing the distributor of a receiver of telegraph signals with the transitions of the received signals, which comprises first sensing means for generating a pulse of predetermined duration each time a transition in the received signal occurs before an optimum time as determined by the receiving distributor, second sensing means for generating a pulse of predetermined duration each time a transition in the received signal occurs after the optimum time, single synchronizing information storage capacitor, a first charging circuit energized by said one first sensing means for charging the capacitor an incremental amount proportional to the pulse duration each time a pulse is generated by the first sensing means, a second charging circuit energized by the second sensing means for oppositely charging said one capacitor an incremental amount proportional to the pulse duration each time a pulse is generated by the second sensing means, a first level sensing circuit, energized by said one capacitor upon reaching a predetermined charge, a second level-sensing circuit energized by said one capacitor upon reaching a predetermined opposite charge, a pulse-operated driving means for the receiving distributor, and means operated by the two level sensing circuits for adding or withholding pulses from the distributor driving means dependent upon the energization of one or the other of the level sensing circuits.

8. In a telegraph receiver including a local oscillator and a distributor, apparatus for synchronizing the receiver with signals received from a telegraph transmitter, which comprises a gate circuit interconnected between the local oscillator and the distributor, first sensing means for generating a pulse of predetermined duration each time a transition in the received signal occurs before an optimum time as determined by timing pulses produced by the local oscillator and applied to the distributor through said gate circuit, second sensing means for generating a pulse of predetermined duration each time a transition in the received signal occurs after the optimum time, single synchronizing information storage capacitor, a first charging circuit energized by the first sensing means for charging said one capacitor an incremental amount proportional to the pulse duration each time a pulse is generated by the first sensing means, a second charging circuit energized by the second sensing means for oppositely charging said one capacitor an incremental amount proportional to the pulse duration each time a pulse is generated by the second sensing means, a first level sensing circuit, energized by said one capacitor upon reaching a predetermined charge, a second level sensing circuit energized by said one capacitor upon reaching a predetermined opposite charge, means operated by the two level sensing circuits for adding or withholding pulses from the pulses passed by said gate dependent upon the energization of one or the other of the level sensing circuits, and motor controlled capacitive means for increasing or decreasing the frequency of the local oscillator dependent upon the energization of one or the other of the level sensing circuits.

9. In a telegraph receiver having a local oscillator for controlling its operation, apparatus for synchronizing the frequency of the local oscillator with received signals upon occurrence of a phase differential between the received signal transitions and the pulses produced by the local oscillator, which comprises a tank circuit connected across the local oscillator including a variable capacitor, a rotative device for varying the capacitance of said capacitor, means including an energizable winding for rotating said device in one direction, means including another energizable winding for rotating said device in the other direction, means for sensing a lag in phase relationship between the locally produced pulses and received signal transitions and operable to produce an output pulse of one polarity to indicate occurrence of a phase lag, means for sensing a lead in phase relationship between the locally produced pulses and the received signal transitions and operable to produce an output pulse of opposite polarity to indicate occurrence of a phase lead, a single synchronizing information storage capacitor connected to both of said sensing means for incrementally adding said output pulses of both polarities, a first voltage sensitive circuit for recognizing a predetermined voltage of one polarity accumulated on said one capacitor as representing a phase lead condition, a second voltage sensitive circuit for recognizing a predetermined voltage of another polarity accumulated on said one capacitor as representing a phase lagging condition, a first amplifier circuit for amplifying the output of said first voltage sensitive circuit and for effecting energization of one of said rotative device windings to decrease the capacitance of said variable capacitor and thereby to increase the frequency of the local oscillator, and a second amplifier circuit for amplifying the output of said second voltage sensitive circuit and for effecting energization of the other of said rotative device windings to increase the capacitance of the variable capacitor and thereby to decrease the frequency of the local oscillator.

10. In a telegraph receiver having a local oscillator for controlling its operation and a frequency divider network operable therefrom, apparatus for synchronizing the frequency of the local oscillator with received signals upon occurrence of an out-of-phase relationship of the received signal transitions to the frequency divider transitions derived from the local oscillator comprising first means for generating a control pulse to indicate occurrence of a leading phase relationship between the locally produced transitions and the received signal transitions, means operable by said first control pulse generating means to withhold pulses from the frequency divider network and simultaneously to decrease the frequency of the local oscillator, second means for generating a control pulse to indicate occurrence of a lagging phase relationship between the locally produced transitions and the received signal transitions, and means operable by said second control pulse generating means to add pulses to the frequency divider network and simultaneously to increase the frequency of the local oscillator, and means for disabling only the local oscillator frequency correction means.

11. In a telegraph receiver having a local oscillator for controlling its operation and a frequency divider network operable therefrom, apparatus for synchronizing the frequency of the local oscillator with received signals upon occurrence of an out-of-phase relationship of the received signal transitions to the frequency divider transitions derived from the local oscillator comprising a first gating circuit for detecting a leading phase relationship between locally produced transitions and received signal transitions, which when detected initiate a control pulse, a signal synchronizer information storage capacitor, means activated by said control pulse for placing a positive charge of predetermined duration upon said capacitor, a second gating circuit for detecting a lagging phase relationship between locally produced transitions and received signal transitions which when detected initiate a control pulse, means activated by said second-mentioned control pulse for placing a negative charge of predetermined duration upon the same single synchronizer information storage capacitor, sensing means energized in a first sense under the control of said one capacitor upon accumulation thereon of a predetermined charge and in a second sense under the control of said same capacitor upon accumulation thereon of a predetermined different charge, a first partial discharging means operated by said first sensing means upon sensing the first-mentioned predetermined charge, a second partial discharging means operated by said second sensing means upon sensing the predetermined different charge, a variable capacitor for varying the frequency of the local oscillator, a rotative device for controlling said variable capacitor, a first frequency correction circuit activated by said first sensing means for energizing the rotative device to increase the capacitance of the variable capacitor and thereby to decrease the frequency of the local oscillator, a second frequency correction circuit activated by said second sensing means for energizing the rotative device oppositely for decreasing the capacitance of the variable capacitor to increase the frequency of the local oscillator, and a correction means operated simultaneously with the frequency correction means and initiated by the two sensing circuits, respectively, for adding or withholding pulses from the frequency divider network upon energization of one or the other of said sensing means.

References Cited in the file of this patent

UNITED STATES PATENTS 2,575,268 Griffith ---------------- Nov. 13, 1951
2,595,656 Hansen ----------------- May 6, 1952